United States Patent
Morley et al.

(10) Patent No.: US 10,023,686 B2
(45) Date of Patent: *Jul. 17, 2018

(54) FAST CURING HIGH GLASS TRANSITION TEMPERATURE EPOXY RESIN SYSTEM

(71) Applicant: Dow Global Technologies LLC, Midland, MI (US)

(72) Inventors: Timothy A. Morley, Schindellegi (CH); Rainer Koeniger, St. Gallenkappel (CH); Sergio Grunder, Zurich (CH); Nebojsa Jelic, Wangen (CH); Rolf Hueppi, Gommiswald (CH)

(73) Assignee: Dow Global Technologies LLC, Midland, MI (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/037,498

(22) PCT Filed: Feb. 2, 2015

(86) PCT No.: PCT/US2015/014047
§ 371 (c)(1),
(2) Date: May 18, 2016

(87) PCT Pub. No.: WO2015/119881
PCT Pub. Date: Aug. 13, 2015

(65) Prior Publication Data
US 2016/0347903 A1    Dec. 1, 2016

Related U.S. Application Data

(60) Provisional application No. 61/936,899, filed on Feb. 7, 2014.

(51) Int. Cl.

| | | |
|---|---|---|
| *B32B 27/38* | (2006.01) | |
| *B32B 27/26* | (2006.01) | |
| *B32B 27/04* | (2006.01) | |
| *C08L 63/00* | (2006.01) | |
| *C08L 63/04* | (2006.01) | |
| *C08G 59/38* | (2006.01) | |
| *C08G 59/50* | (2006.01) | |
| *C08J 5/04* | (2006.01) | |

(52) U.S. Cl.
CPC ......... *C08G 59/502* (2013.01); *C08J 5/042* (2013.01); *C08L 63/00* (2013.01); *C08L 63/04* (2013.01); *C08J 2363/02* (2013.01); *C08J 2363/04* (2013.01); *C08L 2205/02* (2013.01); *C08L 2205/05* (2013.01)

(58) Field of Classification Search
CPC .. C08G 59/38; C08G 59/5006; C08G 59/502; C08L 63/00; C08J 5/24; B32B 27/04; B32B 27/26; B32B 27/38
USPC .............. 523/428; 428/297.4, 413
See application file for complete search history.

(56) References Cited

U.S. PATENT DOCUMENTS

| | | |
|---|---|---|
| 2,839,480 A | 6/1958 | Arlesheim et al. |
| 3,306,872 A | 2/1967 | Maycock et al. |
| 3,341,580 A | 9/1967 | Hechenbleikner |
| 3,379,684 A | 4/1968 | Wiesner |
| 3,477,990 A | 11/1969 | Dante et al. |
| 3,547,881 A | 12/1970 | Mueller et al. |
| 3,609,116 A * | 9/1971 | Thomas ............... C08L 63/00 523/429 |
| 3,637,590 A | 1/1972 | Landua |
| 3,694,406 A * | 9/1972 | D'Alelio et al. .... C08G 18/003 528/48 |
| 3,769,226 A * | 10/1973 | Markovitz et al. .. C08G 59/423 525/506 |
| 3,843,605 A | 10/1974 | Schmidt et al. |
| 3,948,855 A | 4/1976 | Perry |
| 3,956,237 A | 5/1976 | Doorakian et al. |
| 4,025,548 A * | 5/1977 | Huemmer .......... C08G 65/2615 525/530 |
| 4,048,141 A | 9/1977 | Doorakian et al. |
| 4,093,650 A | 6/1978 | Doorakian et al. |
| 4,097,569 A * | 6/1978 | Waters .............. B29C 41/003 138/140 |
| 4,131,633 A | 12/1978 | Doorakian et al. |
| 4,132,706 A | 1/1979 | Doorakian et al. |
| 4,171,420 A | 10/1979 | Doorakian et al. |
| 4,177,216 A | 12/1979 | Doorakian et al. |
| 4,302,574 A | 11/1981 | Doorakian et al. |
| 4,320,222 A | 3/1982 | Lopez |
| 4,358,578 A | 11/1982 | Brownscombe |
| 4,366,295 A | 12/1982 | Tyler, Jr. et al. |
| 4,389,520 A | 6/1983 | Gannon |
| 4,992,228 A | 2/1991 | Heck et al. |
| 5,080,851 A | 1/1992 | Flonc et al. |
| 5,698,318 A | 12/1997 | Burton et al. |
| 9,309,354 B2 * | 4/2016 | Shields ................ C08G 59/56 |

(Continued)

FOREIGN PATENT DOCUMENTS

| | | | |
|---|---|---|---|
| EP | 2522508 A2 | 11/2012 | |
| JP | 05-125152 A * | 5/1993 | ............. C08G 59/50 |

(Continued)

OTHER PUBLICATIONS

Machine translation of JP 05-125152 A (no date).*

*Primary Examiner* — Michael J Feely

(57) ABSTRACT

A two-component curable epoxy resin system having an epoxy component containing a unique combination of two or more epoxy resins with at least one of the epoxy resins being an epoxy novolac type resin. The composite made from such resin system exhibits high glass transition temperature.

11 Claims, No Drawings

(56) References Cited

U.S. PATENT DOCUMENTS

| | | | |
|---|---|---|---|
| 9,321,880 B2 * | 4/2016 | Grunder | ............... C08G 59/245 |
| 9,688,807 B2 * | 6/2017 | Grunder | ................. B29C 70/48 |
| 2012/0285342 A1 * | 11/2012 | Adelman | ................ B41C 1/045 |
| | | | 101/401 |

FOREIGN PATENT DOCUMENTS

| | | | |
|---|---|---|---|
| WO | 2008/140906 | 11/2008 | |
| WO | 2008/153542 A1 | 12/2008 | |
| WO | WO 2012/177392 A1 * | 12/2012 | ............. C08G 59/56 |
| WO | WO 2014/078218 A1 * | 5/2014 | ............. C08G 59/50 |
| WO | WO 2014/078219 A1 * | 5/2014 | ............. C08G 59/50 |

* cited by examiner

US 10,023,686 B2

FAST CURING HIGH GLASS TRANSITION TEMPERATURE EPOXY RESIN SYSTEM

FIELD OF THE INVENTION

This invention relates to an epoxy based composition and processes for preparing fiber-reinforced composites.

INTRODUCTION

For many reasons, it is in some cases potentially advantageous to replace metal structural parts with reinforced organic polymers. Among the advantages the reinforced organic polymers offer include better resistance to corrosion, the ability to produce parts having complex geometries, and in some cases a superior strength-to-weight ratio. It is this last attribute that has led, and continues to lead, the adoption of reinforced polymers in the transportation industry as replacement for metal structural elements such as chassis members and other structural supports.

Epoxy resin systems are sometimes used as the polymer phase in such composites. Cured epoxy resins are often quite strong and stiff, and adhere well to the reinforcement. An advantage of epoxy resin systems, compared to most thermoplastic systems, is that low molecular weight, low viscosity precursors are used as starting materials. The low viscosity is an important attribute because it allows the resin system to penetrate easily between and wet out the fibers that usually form the reinforcement. This is necessary to avoid cosmetic blemishes such as flow lines and to produce a high strength composite.

Despite the potential advantages of these polymer composites, they have achieved only a small penetration into the automotive market. The main reason for this is cost. Metal parts can be produced using very inexpensive stamping processes that have the further advantage of producing parts at high operating rates. Polymer composites, on the other hand, must be produced in some sort of mold in which the polymer and reinforcing fibers are held until the polymer cures. The time required for this curing step directly affects production rates and equipment utilization, and therefore costs. Epoxy systems used for making these composites have required long in-mold residence times, and so the production cost has for the most part not been competitive with metal parts. Because of this, the use of epoxy resin composites to replace stamped metal parts has been largely limited to low production run vehicles.

It is believed that in-mold curing times need to be reduced into the range of approximately 3 to 5 minutes for epoxy composites to become competitive with stamped metal parts for high production volume vehicles.

The manufacturing method of choice for making these fiber-reinforced composites is a resin-transfer process, or one of its variants such as vacuum-assisted resin transfer molding (VARTM), the Seeman Composites Resin Infusion Molding Process (SCRIMP), gap resin transfer molding (also known as compression RTM) and wet compression molding. In these processes, the reinforcing fibers are formed into a preform which is placed and impregnated with a mixture of an epoxy resin component and a hardener which flows around and between the fibers, and is cured in a mold to form the composite.

The mold-filling step of these processes often takes 15 to 60 seconds or even more, depending on the size of the part and the particular equipment being used. During the entire mold-filling process, the resin system must maintain a viscosity low enough to allow it to flow between the reinforcing fibers and completely fill the mold. Resin systems formulated to cure rapidly also tend to build viscosity quite rapidly. If the fibers are pre-heated, which is often the case, the resin system can react very rapidly at points of contact with the heated fibers. The viscosity increase that accompanies this premature curing makes it difficult for the epoxy resin system to penetrate between fibers and wet them out. This will result in moldings having problems that range from the cosmetic (visible flow lines, for example) to structural (the presence of voids and/or poor adhesion of the cured resin to the reinforcing fibers, each of which leads to a loss in physical properties).

The problem of too-rapid viscosity build usually cannot be overcome by increasing operating pressures (that is, the force used to introduce the resin system into the mold) because doing so can move the reinforcing fibers around within the mold, leading to spots that have little or no reinforcement and other regions in which the fibers are packed more densely. This causes inconsistent properties throughout the part, and a general weakening of the composite as a whole. Therefore, an epoxy resin system useful in resin transfer molding (and related) processes should not only have a low initial viscosity and cure rapidly, but should also build viscosity slowly during the initial stages of cure.

Another important consideration is the glass transition temperature of the cured resin. For curing epoxy resin systems, the glass transition temperature increases as the polymerization reactions proceed. It is generally desirable for the resin to develop a glass transition temperature in excess of the mold temperature so the part can be demolded without damage. In some cases, the polymer must in addition achieve a glass transition temperature high enough for the part to perform properly in its intended use. Therefore, in addition to the curing attributes already described, the epoxy system must be one which can attain the necessary glass transition temperature upon full cure.

A glass transition temperature greater than 110° C. is generally regarded as a minimum requirement for many structural composites; a preferred glass transition temperature is 120° C. and a more preferred glass transition temperature is 130° C. or more. This glass transition temperature ideally develops while the part is on the mold, rather than in some post-curing process, so that the composite is strong and rigid upon demolding and so can be demolded without being damaged, and additional costs of performing a post-curing step can be avoided.

The glass transition temperature of existing systems can be increased through the addition of a cycloaliphatic diamine crosslinker such as isophorone diamine. However the cycloaliphatic diamine reacts more slowly, and as a result it is necessary to increase mold temperatures very significantly in order to obtain short demold times. Even at a 120° C. mold temperature, demold times can be 50 to 100% longer when the cycloaliphatic diamine crosslinker is present. If higher mold temperatures are used, the open time becomes too short. Therefore, the system provides enhanced glass transition temperature at the expense of a much longer demold time and/or a much shorter open time, depending on the mold temperature that is selected. In any event, much higher mold temperatures are needed than is the case when the cycloaliphatic diamine is omitted.

Another very significant issue with the foregoing is the presence of diethylene triamine, which is coming under regulatory pressure in some jurisdictions. There is a strong desire to replace diethylene triamine with an alternative hardener, while retaining the benefits of low initial viscosity, good open time and fast cure. A higher glass transition temperature would be a further advantage, if it could be obtained without comprising the needed curing characteristics.

What is desired is a method for producing good quality fiber-reinforced epoxy resin composites with short cycle times. The epoxy resin system should have a long open time and a low initial viscosity, and should then cure rapidly to produce a composite in which the resin phase has a glass transition temperature of at least 110° C., preferably at least 120° C., and more preferably at least 130° C. or higher.

SUMMARY OF THE INVENTION

The present invention provides a curable resin system having:
1) an epoxy component containing two or more epoxy resins, wherein at least one of the epoxy resins is a polyglycidyl ether of a polyphenol having an epoxy equivalent weight of up to about 250 and at least one other epoxy resin is an epoxy novolac resin; and
2) a hardener component comprising polyethylene tetraamine mixture.

The present invention also provides a composite made from such resin system and the composite has a glass transition temperature of at least 110° C.

DETAILED DESCRIPTION OF THE INVENTION

Applicants have found a unique resin system with the combination of an epoxy component and a hardener component to provide a unique and unexpected combination of extended open time and fast cure, while at the same time producing a high (>130° C.) glass transition temperature cured polymer. Mold temperatures needed to accomplish this generally do not exceed 160° C.

1. The Epoxy Component

In the present invention, the epoxy component contains two or more epoxy resins having an average of two or more epoxide groups that are curable by reaction with a primary or secondary amine per molecule. The epoxy component contains at least 10% by weight of one epoxy resin which is one or more polyglycidyl ethers of a polyphenol having an epoxy equivalent weight of up to about 250. In the resin system of the present invention, the epoxy component contains about, based on the total weight of the epoxy component, more than 10 wt. %, preferably more than 20 wt. %, and more preferably more than 40 wt. % of such polyglycidyl ethers of a polyphenol resin.

The polyglycidyl ether of a polyphenol resin useful in the present invention has a lower mono hydrolyzed resin content. The resin may contain, for example and based on the total weight of the polyglycidyl ether of a polyphenol resin, no more than 3 wt. %, preferably no more than 2 wt. % and still more preferably no more than 1 wt. % of mono hydrolyzed resin content. Mono hydrolyzed resins are α-glycol compounds formed by the addition of a molecule of water to an epoxide group. The presence of significant quantities of mono hydrolyzed content tends to increase the viscosity of the epoxy component, and in turn that of the epoxy resin/hardener mixture. In addition, it is believed that these species may contribute to a reduction in open time.

In a preferred embodiment, the other epoxy resins in the epoxy component contain epoxy novolac resins. Epoxy novolac resins useful in the present invention can be generally described as methylene-bridged polyphenol compounds, in which some or all of the phenol groups are capped with an epoxy containing group, typically by reaction of the phenol groups with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225 and especially from 170 to 190. The epoxy novolac resin may contain, for example, from 2 to 10, preferably 3 to 6, more preferably 3 to 5 epoxide groups per molecule. Among the suitable epoxy novolac resins are those having the general structure:

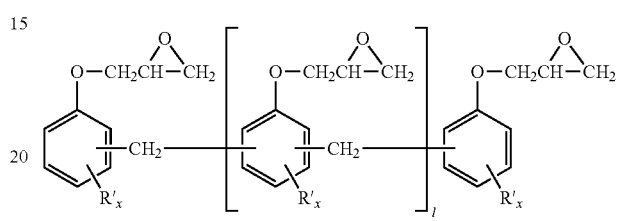

in which l is an integer from 0 to 8, preferably 1 to 4, more preferably 1 to 3, each R' is independently alkyl or inertly substituted alkyl, and each x is an integer from 0 to 4, preferably 0 to 2 and more preferably 0 to 1. R' is preferably methyl if present. In the resin system of the present invention, the epoxy component contains about, based on the total weight of the epoxy component, less than 90 wt. %, preferably less than 80 wt. %, and more preferably less than 70 wt. % of such epoxy novolac type resins.

The polyglycidyl ether of a polyphenol resin may also be a part of the epoxy component useful in the present invention and it will typically have an epoxy equivalent weight of up to about 250.

Furthermore, the epoxy component may also contain optional ingredients. Among these are solvents or reactive diluents such as are described in WO 2008/140906, pigments, antioxidants, preservatives, impact modifiers, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nano-particles, wetting agents and the like. An electro-conductive filler may be present in the epoxy component.

2. The Hardener Component

The hardener component of the present resin system may be a polyethylene tetraamine mixture. By "polyethylene tetraamime mixture", it is meant a mixture of polyethylene polyamine compounds, of which at least 95% by weight, based on the total weight of the mixture, have exactly four amine nitrogen atoms. For purposes of this invention, those polyethylene polyamine compounds having exactly four amine nitrogen atoms are referred to as "polyethylene tetraamine" compounds.

The polyethylene tetraamine compound can be linear, branched and/or or cyclic. At least 40% of the weight of the polyethylene tetraamine mixture is linear triethylene tetraamine, that is:

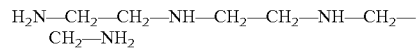

Linear triethylene tetraamine may constitute at least 60%, preferably at least 90%, more preferably at least 95%, and most preferably up to 100%, of the weight of the polyethylene tetraamine mixture, based on the total weight of the mixture.

The polyethylene tetraamine mixture may include other polyethylene tetraamine compounds such as, for example, N,N'-bis(2aminoethyl)piperazine, (piperazinoethyl)ethylenediamine and tris(aminoethyl)amine. These polyethylene tetraamine compounds are commonly present in significant amounts (up to, for example 55% or up to 35% by weight based on total weight of the hardener component in the aggregate) in commercially available TETA (triethylene tetraamine) products.

The polyethylene tetraamine mixture may include small amounts of other aliphatic or cycloaliphatic amine compounds having three or fewer amine nitrogen atoms or five or more amine nitrogen atoms. These compounds preferably constitute at most 5% by weight, preferably at most 2% by weight and more preferably at most 1% by weight of the polyethylene tetraamine mixture. The polyethylene tetraamine mixture preferably contains no more than 0.3% by weight of aminoethylethanol amine.

In a preferred embodiment, the polyethylene tetraamine mixture is the only hardener in the resin system. If other hardeners are present, they preferably constitute no more than 20%, more preferably no more than 10% and still more preferably no more than 5% by weight of the hardener component. Among the other hardeners that can be used are, for example, dicyandiamide, phenylene diamine (particularly the meta-isomer), bis(4-amino-3,5-dimethylphenyl)-1, 4-diisopropyl-benzene,bis(4-amino-phenyl)1,4-diiospropyl-benzene, diethyl toluene diamine, methylene dianiline, mixtures of methylene dianiline and polymethylene polyaniline compounds (sometimes referred to as PMDA, including commercially available products such as DL-50 from Air Products and Chemicals), diaminodiphenylsulfone, phenolic hardeners including those represented by the structure (III)

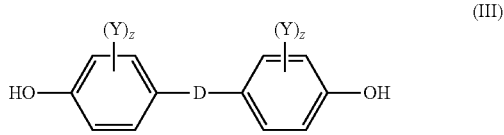

(III)

where each Y independently represents a halogen atom, each z is independently an integer from 0 to 4 and D is a divalent hydrocarbon group as described with regard to structure I above. Examples of suitable phenolic hardeners include dihydric phenols such as bisphenol A, bisphenol K, bisphenol F, bisphenol S and bisphenol AD, and mixtures thereof, and their mono-, di-, tri- and tetra-brominated counterparts and amino-functional polyamides. These are available commercially under as Versamide® 100, 115, 125 and 140, from Henkel, and Ancamide® 100, 220, 260A and 350A, from Air Products and Chemicals.

In one preferred embodiment, the hardener component of the present invention contains over 90 wt. % of triethylenetetramine and the rest being 1,4-diazabicyclo[2,2,2]octane, based on the total weight of the hardener component.

3. The Resin System

The hardener component and epoxy component are combined in amounts such that at least 0.8 epoxy equivalents are provided to the reaction mixture of the two components per amine hydrogen equivalent provided by the epoxy component. A preferred amount is at least 0.9 epoxy equivalents per amine hydrogen equivalent and a still more preferred amount is at least 1.0 epoxy equivalents per amine hydrogen equivalent. The epoxy component can be provided in large excess, such as up to 10 epoxy equivalents per amine hydrogen equivalent provided to the reaction mixture, but preferably there are no more than 2, more preferably no more than 1.25 and still more preferably no more than 1.10 epoxy equivalents provided per amine hydrogen equivalent. Embodiments in which the hardener is present in a small excess (for example from 0.0 to 0.80 epoxy equivalents per equivalent of amine hydrogen) often exhibit particularly short demold times while producing a cured resin having a high glass transition temperature.

In one embodiment, triethylene diamine is provided to the reaction mixture of epoxy and hardener components and performs a catalytic role. A suitable amount is about 0.01 to 0.5 moles of triethylene diamine per part per mole of per mole of primary and/or secondary amine compounds in the amine hardener. A preferred lower amount is 0.025 moles and a more preferred lower amount is 0.05 moles of triethylene diamine per mole of per mole of primary and/or secondary amine compounds in the amine hardener. A preferred upper amount is up to 0.25 moles and a more preferred upper amount is up to 0.20 moles of triethylene diamine, in each case per mole of primary and/or secondary amine compounds in the amine hardener. An especially preferred amount is 0.09 to 0.175 moles of triethylene diamine per mole of primary and/or secondary amine compounds in the amine hardener.

The catalyst can be used in conjunction with one or more other catalysts. If such an added catalyst is used, suitable such catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference. Examples of suitable catalysts are imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((dimethylamino)methyl)phenol and tributylamine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; various carboxylic acid compounds, and mixtures any two or more thereof.

In some other embodiments, the triethylene diamine is the sole catalyst provided to the reaction mixture. It is noted that the hardener components are not, for purposes of this invention, considered as catalysts.

In some embodiments, the reaction mixture, that is, the resin system of the present invention, contains water and/or a compound having at least one hydroxyl group and an equivalent weight per hydroxyl group of up to 75, preferably up to 50. This compound, if present, is suitably present in small amounts, such as from 0.1 to 10 parts by weight, preferably from 0.25 to 5 parts and still more preferably from 1 to 3 parts by weight per part by weight of triethylene diamine. Besides water, suitable such compounds include, for example, alkanols such as methanol, ethanol, 1-propanol, 2-propanol, 1-butanol, 2-butanol, 1-pentanol, neopentanol, 1-hexanol and the like; alkylene glycols such as ethylene glycol, 1,2-propane diol, 1,3-propane diol, 1,4-butane diol, and neopentyl glycol; poly(alkylene glycols) such as diethylene glycol, triethylene glycol, dipropylene glycol, tripropylene glycol and the like; glycol monoethers such as ethylene glycol monomethyl ether, diethylene glycol monomethyl ether, 1,2-propane diol monomethyl ether, dipropylene glycol monomethyl ether, as well as the corresponding ethyl ethers; glycol monoesters such as ethylene glycol monoacetate, diethylene glycol monoacetate, 1,2-propane diol monoacetate, dipropylene glycol monoacetate; higher functionality polyols such as glycerin, oligomers of glycerin, trimethylolpropane, trimethylolethane, pentaerythritol, erythritol, sorbitol, sucrose and the like; and mono- di- or trialkanolamines such as monoethanolamine, diethanolamine, triethanolamine, monoisopropanolamine, diisopropanolamine, triisopropanolamine, aminoethylethanolamine and the like.

The curable reaction mixture may also contain other optional components such as impact modifiers, internal mold release agents (IMR), pigments, antioxidants, preservatives, reinforcing fibers short (up to about 6 inches (15.24 cm) in length, preferably up to 2 inches (5.08 cm) in length, more preferably up to about ½ inch (1.27 cm) in length), non-fibrous particulate fillers including micron- and nanoparticles, wetting agents, internal mold release agents and the like. An electroconductive filler may be present in the hardener mixture.

Suitable impact modifiers include natural or synthetic polymers having a $T_g$ of lower than −40° C. These include natural rubber, styrene-butadiene rubbers, polybutadiene rubbers, isoprene rubbers, polyethers such as poly(propylene oxide), poly(tetrahydrofuran) and butylene oxide-ethylene oxide block copolymers, core-shell rubbers, mixtures of any two or more of the foregoing, and the like. The rubbers are preferably present in the form of small particles that become dispersed in the polymer phase of the resin system. The rubber particles can be dispersed within the epoxy resin or hardener and preheated together with the epoxy resin or hardener prior to forming the hot reaction mixture.

It is generally preferred to cure the epoxy resin and the hardener mixture in the presence of an internal mold release agent. Such an internal mold release agent may constitute up to 5%, more preferably up to about 1% of the total weight of the reaction mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Würtz GmbH, Waterworks Aerospace Release by Zyvax and Kantstik™ by Specialty Products Co. In addition to (or instead of) adding the internal mold release agent during mixing, it is also possible to combine such an internal mold release agent into the epoxy component and/or the hardener component before the epoxy component and the hardener component are brought together.

Suitable particulate fillers have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

In some embodiments, the present resin system has, when cured at least one temperature between 100 and 150° C., a gel time of at least 10 seconds, at least 15 seconds, or preferably at least 20 seconds, and a demold time no greater than 300 seconds, preferably no greater than 240 seconds and still more preferably no greater than 120 seconds. In some embodiments, the demold time is no greater than 120 seconds or no greater than 60 seconds at this temperature. Gel time and demold time are for purposes of this invention measured by using a KraussMaffei Rim Star RTM 4/4 high-pressure injection machine where the gel time is measured during a curing evaluation test as described in the testing methods section of this application.

Thermoset resins are formed from the resin system of the invention by mixing the epoxy component and hardener component at proportions as described above and curing the resulting mixture. Either or both of the components can be preheated if desired before they are mixed with each other. It is generally necessary to heat the mixture to an elevated temperature to obtain a rapid cure. In a molding process such as the process for making molded composites, the curable reaction mixture is introduced into a mold, which may be, together with any reinforcing fibers and/or inserts as may be contained in the mold, preheated. The curing temperature may be, for example, from 60 to 180° C. When a long (at least 10 seconds, preferably at least 20 seconds) gel time is desirable, the curing temperature preferably is not greater than 160° C. When both a long gel time and a short demold time is wanted, a suitable curing temperature is 80 to 160° C., preferably 100 to 150° C. and especially 110 to 140° C.

It is preferred to continue the cure until the resulting resin system attains a glass transition temperature in excess of the cure temperature. The glass transition temperature at the time of demolding is preferably at least 120° C., more preferably at least 130° C., still more preferably at least 140° C. and even more preferably at least 150° C. An advantage of this invention is that such glass transition temperatures can be obtained with short curing times. This allows for short cycle times. Demold times at cure temperatures of 100 to 150° C., especially 110 to 140° C., are typically 300 seconds or less, preferably are 240 seconds or less and more preferably 180 seconds or less. In some embodiments, the demold time at such temperatures is no more than 120 seconds or no more than 60 seconds.

4. The Composites and the Process of Making the Composite

The curable epoxy resin system of the invention is particularly useful for making fiber-reinforced composites by curing the system in the presence of reinforcing fibers. These composites are in general made by mixing the epoxy component with the hardener component to form a mixture or the resin system of the present invention, wetting the fibers with the mixture, and then curing the mixture in the presence of the catalyst and the reinforcing fibers.

The reinforcing fibers are thermally stable and have a high melting temperature, such that the reinforcing fibers do not degrade or melt during the curing process. Suitable fiber materials include, for example, glass, quartz, polyamide resins, boron, carbon, wheat straw, hemp, sisal, cotton, bamboo and gel-spun polyethylene fibers.

The reinforcing fibers can be provided in the form of short (0.5 to 15 cm) fibers, long (greater than 15 cm) fibers or continuous rovings. The fibers can be provided in the form of a mat or other preform if desired; such mats or preforms may in some embodiments be formed by entangling, weaving and/or stitching the fibers, or by binding the fibers together using an adhesive binder. Preforms may approximate the size and shape of the finished composite article (or portion thereof that requires reinforcement). Mats of continuous or shorter fibers can be stacked and pressed together, typically with the aid of a tackifier, to form preforms of various thicknesses, if required.

Suitable tackifiers for preparing preforms (from either continuous or shorter fibers) include heat-softenable polymers such as described, for example, in U.S. Pat. Nos. 4,992,228, 5,080,851 and 5,698,318. The tackifier should be compatible with and/or react with the polymer phase of the composite, so that there is good adhesion between the polymer and reinforcing fibers. A heat-softenable epoxy resin or mixture thereof with a hardener, as described in U.S. Pat. No. 5,698,318, is especially suitable. The tackifier may contain other components, such as one or more catalysts, a thermoplastic polymer, a rubber, or other modifiers.

A sizing or other useful coating may be applied onto the surface of the fibers before they are introduced into the mold. A sizing often promotes adhesion between the cured epoxy resin and the fiber surfaces.

The composite may be formed in a mold. In such a case, the reinforcing fibers may be introduced into the mold before the epoxy/hardener mixture. This is normally the case when a fiber preform is used. The fiber preform is placed into the mold, the mold is closed, and the epoxy resin/hardener mixture is then introduced into the mold, where it penetrates between the fibers in the preform, fills the cavity, and then cures to form a composite product.

Alternatively, the fibers (including a preform) can be deposited into an open mold, and the reaction mixture can be sprayed, poured or injected onto the preform and into the mold. After the mold is filled in this manner, the mold is closed and the resin system cured. An example of a process of this type is gap compression resin transfer molding, in which the mold containing the fibers is kept open with a gap which may be, for examples 10 to 100% or more of the original cavity thickness. The gap permits lower flow resistance, which makes mold filling easier and facilitates penetration of the reaction mixture around and between the fibers.

Short fibers can be introduced into the mold with the resin system. Such short fibers may be, for example, blended with the epoxy component or hardener component (or both) prior to forming the reaction mixture. Alternatively, the short fibers may be added into the reaction mixture at the same time as the epoxy and hardener are mixed, or afterward but prior to introducing the hot reaction mixture into the mold.

Alternatively, short fibers can be sprayed into a mold. In such cases, the reaction mixture can also be sprayed into the mold, at the same time or after the short fibers are sprayed in. When the fibers and reaction mixture are sprayed simultaneously, they can be mixed together prior to spraying. Alternatively, the fibers and reaction mixture can be sprayed into the mold separately but simultaneously. The sprayed materials may be spread and/or leveled using a doctor blade or similar device before closing the mold and performing the cure. In a process of particular interest, long fibers are chopped into short lengths and the chopped fibers are sprayed into the mold, when or immediately before the hot reaction mixture is sprayed in. Mesh materials often function as flow promoters.

A wet compression process can be used, in which the reaction mixture is applied directly to a fiber preform or stack without injection by spraying (as in the PUpreg or Baypreg processes), or by laying it down as "bands" of system, which are being fed through a wider slit die, which could have a width of 1 cm to 50 cm or more. Sufficient material is applied to reach the desired fiber volume content in the final product. The reaction mixture can be applied to the fibers inside an open mold, or outside the mold. The reaction mixture may instead be applied to the center layer of a buildup, by wetting a layer of fibers with the reaction mixture and then putting a second layer of fibers onto the wetted surface, therefore sandwiching the resin layer in between two layers of fibers. The fiber mats can be made out of non crimped fiber buildups, of woven fabric, of random fiber build-ups or preforms. If the reaction mixture is applied to the fibers outside of the mold, it is typically applied at a somewhat low temperature, to prevent premature curing, and to increase the viscosity of the reaction mixture so it does not drip off the fibers before they are transferred into the mold. The wetted preform is then placed into the lower half of a hot mold, the mold is closed and the material cured under compression.

Composites made in accordance with the invention may have fiber contents of at least 10 volume percent, preferably at least 25 volume percent or at least 35 volume percent, up to 80 volume percent, preferably up to 70 volume percent, more preferably up to 60 volume percent.

The mold may contain, in addition to the reinforcing fibers, one or more inserts. Such inserts may function as reinforcements, may function as flow promoters, and in some cases may be present for weight reduction purposes. Examples of such inserts include, for example, wood, plywood, metals, various polymeric materials, or glass, which may be foamed or unfoamed, such as polyethylene, polypropylene, another polyolefin, a polyurethane, polystyrene, a polyamide, a polyimide, a polyester, polyvinylchloride and the like, various types of composite materials, and the like, that do not become distorted or degraded at the temperatures encountered during the molding step.

The reinforcing fibers and core material, if any, may be enclosed in a bag or film such as is commonly used in vacuum assisted processes.

The mold and the preform (and any other inserts, if any) may be heated to the curing temperature or some other useful elevated temperatures prior to contacting them with the reaction mixture. The mold surface may be treated with an external mold release agent, which may be solvent or water-based.

The particular equipment that is used to mix the components of the reaction mixture and transfer the mixture to the mold is not considered to be critical to the invention, provided the reaction mixture can be transferred to the mold before it attains a high viscosity or develops significant amounts of gels. The process of the invention is amenable to RTM, VARTM, RFI, gap compression resin transfer molding and SCRIMP processing methods and equipment (in some cases with equipment modification to provide the requisite heating at the various stages of the process), as well as to other methods such as wet compression.

The mixing apparatus can be of any type that can produce a highly homogeneous mixture of the epoxy component and hardener component (and any optional materials that are also mixed in at this time). Mechanical mixers and stirrers of various types may be used. Two preferred types of mixers are static mixers and impingement mixers.

In some embodiments, the mixing and dispensing apparatus is an impingement mixer. Mixers of this type are commonly used in so-called reaction injection molding processes to form polyurethane and polyurea moldings. The epoxy component and the hardener component (and other materials which are mixed in at this time) are pumped under pressure into a mixing head where they are rapidly mixed together. Operating pressures in high pressure machines may range from 1,000 to 29,000 psi or higher (6.9 to 200 MPa or higher), although some low pressure machines can operate at significantly lower pressures. The resulting mixture is then preferably passed through a static mixing device to provide further additional mixing, and then transferred into the mold cavity. The static mixing device may be designed into the mold. This has the advantage of allowing the static mixing device to be opened easily for cleaning.

In certain specific embodiments, the epoxy component and the hardener component are mixed as just described, by pumping them under pressure into a mixing head. Impingement mixing may be used. The catalyst is introduced with the epoxy resin, the hardener, or as a separate stream. The operating pressure of the incoming epoxy resin and hardener streams may range from a somewhat low value (for example, from about 1 to about 6.9 MPa) or a high value (such as, for example, from 6.9 to 200 MPa). The resulting mixture of epoxy resin, hardener and catalyst is then introduced into the mold at a somewhat low operating pressure, such as up to 5 MPa or up to about 1.035 MPa). In such embodiments, the mixture of epoxy resin, hardener and catalyst is typically passed through a static mixer before entering the mold. Some or all the pressure drop between the mix-head and the mold injection port often will take place through such a static mixer. An especially preferred apparatus for conducting the process is a reaction injection molding machine, such as is commonly used to processes large polyurethane and polyurea moldings. Such machines are available commercially from Krauss Maffei Corporation and Cannon or Hennecke.

In other embodiments, the reaction mixture is mixed as before, and then sprayed into the mold. Temperatures are maintained in the spray zone such that the temperature of the hot reaction mixture is maintained as described before.

The mold is typically a metal mold, but it may be ceramic or a polymer composite provided the mold is capable of withstanding the pressure and temperature conditions of the molding process. The mold contains one or more inlets, in liquid communication with the mixer(s), through which the reaction mixture is introduced. The mold may contain vents to allow gases to escape as the reaction mixture is injected.

The mold is typically held in a press or other apparatus which allows it to be opened and closed, and which can apply pressure on the mold to keep it closed during the filling and curing operations. The mold or press is provided with means by which heat or cooling can be provided.

In some embodiments of the foregoing process, the molded composite is demolded in no more than 5 minutes, preferably from 1 to 5 minutes, more preferably from 1 to 3 minutes, after the epoxy resin system has been introduced into the mold. In such processes, the introduced resin system flows around and between the reinforcing fibers and fills the mold and then cures in the mold, preferably forming a polymer having a glass transition temperature of at least 120° C. (more preferably at least 130° C. or at least 140° C.) within three minutes, more preferably within two minutes, after the reaction mixture has been introduced into the mold.

The process of the invention is useful to make a wide variety of composite products, including various types of automotive or other transportation parts. Examples of these parts include vertical and horizontal body panels, automobile and truck chassis components, and so-called "body-in-white" structural components. Body panel applications include fenders, door skins, hoods, roof skins, decklids, tailgates and the like. Body panels often require a so-called "class A" automotive surface which has a high distinctness of image (DOI). For this reason, the filler in many body panel applications will include a material such as mica or wollastonite. Parts made in accordance with this invention may be in some cases subjected to high temperatures. For example, certain protective coatings as are commonly used in automotive manufacturing processes often are applied electrostatically in a so-called "ecoat" process, and then subjected to a bake cure. In such a bake cure, the composite may be subject to a temperature of 140 to 220° C., for a period of 10 to 60 minutes. Resin system and composites made in accordance with this invention which are to be coated in such a manner should have a high enough glass transition temperature as to be able to withstand the high temperature of the bake temperature. In addition, an electroconductive filler may be incorporated into the composite to increase the electrical conductivity of the part, to facilitate the electrodeposition process.

The following examples are provided to illustrate the invention, but not limit the scope thereof. All parts and percentages are by weight unless otherwise indicated.

Testing Methods

Gel and Demold Time:

Gel time and demold times, for purposes of this invention, are evaluated according to the following curing evaluation test: the epoxy resin component and hardener component are brought together in the mix head of a KraussMaffei Rim Star RTM 4/4 high-pressure injection machine and injected onto a mold surface at the required molding temperature. Optional materials can be added to either the epoxy resin component or hardener component (or both) either before or at the same time that the epoxy resin and hardener are mixed and injected. The time to gelation was started on impact of the resin with the hot surface. The gel point of the material was determined as the point at which when a spatula was pulled through resin disk the material did not flow back into the cavity created. Demold time is the time after the material contacts the mold surface at which point the disk can be removed from the hot plate surface as a solid, using the pallet knife or similar blade.

Differential Scanning Calorimetry (DSC):

Dynamic DSC was used to determine the Tg value of the resin systems. In a heating ramp of 10° C./min the samples were heated from 25 to 220° C., kept isothermal at 220° C. for three minutes, cooled in a ramp of 10° C. to 25° C., kept isothermal at 25° C. for three minutes, then heated again with a heating ramp of 10° C. to 220° C., kept isothermal at 220° C. for 3 minutes, and cooled in a ramp of 10° C. to 25° C. Tg onset and Tg midpoint are determined from the second heating segment.

Comparative Samples

Epoxy Resin A is a diglycidyl ether of bisphenol A, having an epoxy equivalent weight of about 180 and less than 1% by weight of monohydrolyzed resin. The hardener for Comparative Example 1 is a blend of a triethylene tetraamine mixture commercially available as D.E.H™ 24 by The Dow Chemical Company and triethylene diamine at a mole ratio of 1:0.1.

Inventive Samples

Epoxy Resin B is a diglycidyl ether of bisphenol A, having an epoxy equivalent weight of about 180 and less than 1% by weight of monohydrolyzed resin (80 pbw) mixed with an epoxy novolac based resin with an epoxy equivalent weight of 176 to 181 (20 pbw).

Epoxy Resin C is a diglycidyl ether of bisphenol A, having an epoxy equivalent weight of about 180 and less than 1% by weight of monohydrolyzed resin (60 pbw) mixed with an epoxy novolac based resin with an epoxy equivalent weight of 176 to 181 (40 pbw).

Epoxy Resin D is a diglycidyl ether of bisphenol A, having an epoxy equivalent weight of about 180 and less than 1% by weight of monohydrolyzed resin (40 pbw) mixed with an epoxy novolac based resin with an epoxy equivalent weight of 176 to 181 (60 pbw).

Epoxy Resin E is a diglycidyl ether of bisphenol A, having an epoxy equivalent weight of about 174 and less than 1% by weight of monohydrolyzed resin (80 pbw) mixed with an epoxy novolac based resin with an epoxy equivalent weight of 176 to 181 (20 pbw).

Epoxy Resin F is a diglycidyl ether of bisphenol A, having an epoxy equivalent weight of about 174 and less than 1% by weight of monohydrolyzed resin (60 pbw) mixed with an epoxy novolac based resin with an epoxy equivalent weight of 176 to 181 (40 pbw).

Epoxy Resin G is a diglycidyl ether of bisphenol A, having an epoxy equivalent weight of about 174 and less than 1% by weight of monohydrolyzed resin (40 pbw) mixed with an epoxy novolac based resin with an epoxy equivalent weight of 176 to 181 (60 pbw).

The hardener for Inventive Examples 2 to 40 is in each case a blend of a triethylene tetraamine mixture sold as D.E.H. 24 by The Dow Chemical Company and triethylene diamine at a mole ratio of 1:0.1.

The glass transition temperature of Examples 2 to 7 is evaluated following the method defined above whereby the sample mixtures were prepared by mixing the required amount of resin and hardener with a laboratory mixing device followed by addition of a small amount of the mixture (<15 mg) to an aluminum DSC pan.

The curing characteristics of curable epoxy resin systems Examples 8 to 40 and Comparative Example 1 is evaluated on a KraussMaffei Rim Star RTM 4/4 high-pressure injection machine. The machine is equipped with heated raw material tanks and high pressure capable lines leading to high-pressure hydraulic mixing head. Target mix head pressures are 10 MPa for both resin and hardener. Raw material temperatures are resin (80° C.), Hardener (40° C.), internal mold release (25 to 30° C.).

The stainless steel mold has internal dimensions of length 540 mm, width 290 mm and depth 2.3 mm, and contains a carbon fiber preform having a weight of 300 g/qm. The mold includes a central injection point with two venting points. A closed mold injection procedure is applied. The mold temperatures are as indicated in Tables 1, 3 and 4. resin:hardener weight ratios, demold times and the glass transition temperature of the cured resin phase of the resulting composite are also indicated in Table 1 and 4.

Results

This table demonstrates that when bis phenol A based resin is utilized, Tg's obtained are generally below 130° C. as measured via DSC analysis.

TABLE 2

Testing results for some Inventive Examples

| Example | Resin | Ratio Resin_Hardener Wt. Ratio | Glass Transition Temperature (° C.) |
| --- | --- | --- | --- |
| 2 | B | 100_16.2 | 144 |
| 3 | C | 100_16.4 | 150 |
| 4 | D | 100_16.4 | 160 |
| 5 | E | 100_16.9 | 146 |
| 6 | F | 100_16.9 | 151 |
| 7 | G | 100_16.9 | 157 |

Table 2 demonstrates that via the addition of novolac based resins in the correct proportions, the glass transition temperature for the resin systems can be increased to the levels required. It is surprising that not only does this increase the Tg but also increases the reactivity of these systems making them useful in RTM or wet compression processes where fast demolding time are required to enable mass production of carbon fiber composites.

TABLE 3

Testing results for other Inventive Examples

| Example | Experiment Type | Resin | Ratio Resin_Hardener Wt. Ratio_IMR | Mold Temperature (° C.) | Measured Gel Time (s) |
| --- | --- | --- | --- | --- | --- |
| 8 | GT | C | 100_16.5_2 | 120 | 29 |
| 9 | GT | C | 100_14.9_2 | 120 | 30 |
| 10 | GT | C | 100_14.9_2 | 130 | 23 |
| 11 | GT | C | 100_16.5_2 | 130 | 24 |
| 12 | GT | C | 100_16.5_2 | 140 | 20 |
| 13 | GT | C | 100_14.9_2 | 140 | 18 |
| 14 | GT | D | 100_16.6_2 | 120 | 25 |
| 15 | GT | D | 100_15_2 | 130 | 21 |
| 16 | GT | D | 100_16.6_2 | 130 | 20 |

GT = Gel time

Table 3 demonstrates that with a gel time of greater than 20 seconds, the resin systems of the present invention maintain sufficient latency in order to enable filling of complex molds as well as enable sufficient fiber wet out in carbon fiber based composites.

TABLE 1

Testing results for the Comparative Example 1.

| Comp. Example | Experiment | Resin | Ratio Resin_Hardener Wt. Ratio_IMR | Mold Temp. (° C.) | Demolding Time (s) | Carbon Fiber | Glass Transition Temperature (° C.) |
| --- | --- | --- | --- | --- | --- | --- | --- |
| 1 | CFC | A | 100_16.2_2 | 120 | 120 | AKSA CF 6 × UD 0° CL 300 E 10 B | 123 |

CFC = Carbon fiber composite containing resin, hardener, internal mold release agent and carbon fibers

TABLE 4

Additional testing results for Inventive Examples

| Example | Experiment | Resin | Ratio Resin_Hardener Wt. Ratio_IMR | Mold Temp. (° C.) | Demolding Time (s) | Carbon Fiber | Glass Transition Temperature (° C.) |
|---|---|---|---|---|---|---|---|
| 17 | CC | C | 100_16.5_2 | 120 | 120 | None | 141 |
| 18 | CC | C | 100_16.5_2 | 120 | 60 | None | 141 |
| 19 | CFC | C | 100_16.5_2 | 120 | 60 | AKSA CF 6 × UD 0° CL 300 E 10 B | 141 |
| 20 | CFC | C | 100_16.5_2 | 120 | 120 | AKSA CF 6 × UD 0° CL 300 E 10 B | 140 |
| 21 | CC | C | 100_14.9_2 | 120 | 60 | None | 148 |
| 22 | CFC | C | 100_14.9_2 | 120 | 60 | AKSA CF 6 × UD 0° CL 300 E 10 B | 152 |
| 23 | CC | C | 100_14.9_2 | 130 | 60 | None | 149 |
| 24 | CFC | C | 100_14.9_2 | 130 | 60 | AKSA CF 6 × UD 0° CL 300 E 10 B | 147 |
| 25 | CC | C | 100_16.5_2 | 130 | 60 | None | 141 |
| 26 | CC | C | 100_16.5_2 | 130 | 120 | None | 143 |
| 27 | CFC | C | 100_16.5_2 | 130 | 120 | AKSA CF 6 × UD 0° CL 300 E 10 B | 142 |
| 28 | CFC | C | 100_16.5_2 | 130 | 60 | AKSA CF 6 × UD 0° CL 300 E 10 B | 139 |
| 29 | CC | C | 100_16.5_2 | 140 | 60 | None | 142 |
| 30 | CFC | C | 100_16.5_2 | 140 | 60 | AKSA CF 6 × UD 0° CL 300 E 10 B | 150 |
| 31 | CFC | C | 100_14.9_2 | 140 | 60 | AKSA CF 6 × UD 0° CL 300 E 10 B | 151 |
| 33 | CC | D | 100_16.6_2 | 120 | 60 | None | 149 |
| 34 | CFC | D | 100_16.6_2 | 120 | 60 | AKSA CF 6 × UD 0° CL 300 E 10 B | 154 |
| 35 | CC | D | 100_15.0_2 | 120 | 60 | None | 157 |
| 37 | CC | D | 100_15.0_2 | 130 | 60 | None | 157 |
| 39 | CC | D | 100_16.6_2 | 130 | 60 | None | 152 |
| 40 | CFC | D | 100_16.6_2 | 130 | 60 | AKSA CF 6 × UD 0° CL 300 E 10 B | 156 |

CC = Clear cast that is, a molded part containing only resin, hardener and internal mold release agent with no carbon fibers included These examples, as shown in Table 4, demonstrate that, compared to the Comparative Example 1 while providing sufficient open time in a real application process, the resin system of the present invention can provide the production of carbon fiber composites with demold times as fast as 60 seconds to enable mass production of carbon fiber composite articles for high temperature applications with glass transition temperatures of >130° C., even approaching 160° C. Data demonstrated that, for different mix ratios and resin combinations that when 2 min and 1 min demold times are compared, the glass transition temperature achieved is very similar. This further demonstrates that the cure level at 1 minute is very effective. Furthermore, when comparing clear cast and carbon fiber composite parts, no significant difference in glass transition temperature is observed. This observation indicates that no reduction of cure through the incorporation of carbon fibers at a level of 50 volume %.

The invention claimed is:

1. A curable resin system, comprising
   1) an epoxy component comprising two or more epoxy resins, wherein at least one of the epoxy resins is a polyglycidyl ether of a polyphenol having an epoxy equivalent weight of up to about 250, and at least one of the epoxy resins is an epoxy novolac resin; and
   2) a hardener component comprising over 90 wt. % of a polyethylene tetraamine mixture and a positive amount of 1,4-diazabicyclo[2,2,2]octane, such that the combined amounts of the polyethylene tetraamine mixture and the 1,4-diazabicyclo[2,2,2] octane total 100 wt. % based on the weight of the hardener component.

2. The curable resin system of claim 1, wherein the polyglycidyl ether of a polyphenol comprises no more than 3 wt. %, based on total weight of the polyglycidyl ether of a polyphenol, of mono hydrolyzed resin content.

3. The curable resin system of claim 1, wherein the epoxy component comprises at least 10 wt. % of the polyglycidyl ether of a polyphenol, based on the total weight of the epoxy component.

4. The curable resin system of claim 1, wherein the epoxy novolac resin has an epoxy equivalent weight of about 156 to 300.

5. The curable resin system of claim 4, wherein the epoxy novolac resin has a chemical structure of:

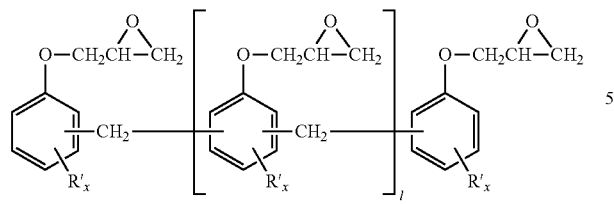

wherein 1 is an integer from 1 to 8, each R' is a methyl group, and each x is independently an integer from 0 to 4.

6. The curable resin system of claim 1, wherein at least 40% of the weight of the polyethylene tetraamine mixture is a linear triethylene tetraamine with a chemical structure of:

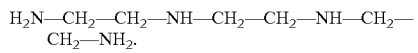

7. A curable resin system of claim 6, wherein 100% of the weight of the polyethylene tetraamine mixture is the linear triethylene tetraamine.

8. A fiber-reinforced composite comprising reinforcing fibers and a cured product of the curable resin system of claim 7.

9. The fiber-reinforced composite of claim 8 having a glass transition temperature greater than 110° C.

10. A fiber-reinforced composite comprising reinforcing fibers and a cured product of the curable resin system of claim 1.

11. The fiber-reinforced composite of claim 10 having a glass transition temperature greater than 110° C.

* * * * *